(No Model.)
W. R. REUD.
GALVANIC BATTERY.
No. 489,832. Patented Jan. 10, 1893.
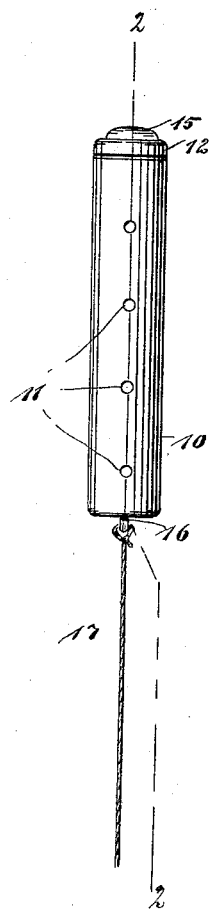
Fig: 1.
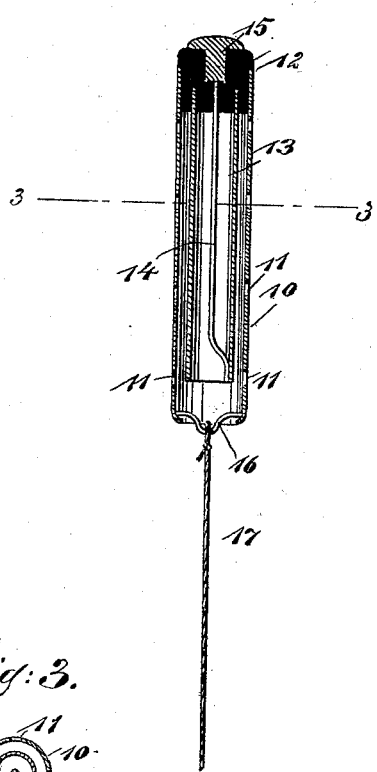
Fig: 2.
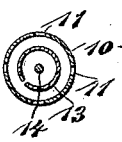
Fig: 3.
WITNESSES:
Chas. Nioli.
E. M. Clark
INVENTOR
William R. Reud
BY
Munn & Co
ATTORNEYS.

UNITED STATES PATENT OFFICE.

WILLIAM ROBERT REUD, OF NEW YORK, N. Y.

GALVANIC BATTERY.

SPECIFICATION forming part of Letters Patent No. 489,832, dated January 10, 1893.

Application filed June 28, 1892. Serial No. 438,281. (No model.)

*To all whom it may concern:*

Be it known that I, WILLIAM ROBERT REUD, of New York city, in the county and State of New York, have invented a new and Improved Galvanic Battery, of which the following is a full, clear, and exact description.

My invention relates to that class of electric batteries which are adapted to be worn upon or applied to the body of a person, so as to send a mild current through certain diseased parts to strengthen, stimulate and cure them.

The object of my invention is to produce an extreme simple and efficient battery of this class, which can be very cheaply made, which will generate a strong electric current in proportion to its size, which is made active by contact with the acids or liquids of the body, and which is of such shape and construction that it may be conveniently and easily inserted in and removed from any of the body apertures, to the end that it may be used internally as well as externally.

To these ends my invention consists of a galvanic battery, the construction of which will be hereinafter described and claimed.

Reference is to be had to the accompanying drawings forming a part of this specification, in which similar numerals of reference indicate corresponding parts in all the figures.

Figure 1 is a side elevation of the battery; Fig. 2 is a longitudinal section on the line 2—2 in Fig. 1; and Fig. 3 is a cross section on the line 3—3 in Fig. 2.

The battery has an outer cylindrical shell 10, of copper, which forms one pole of the battery, and is provided with numerous perforations 11, to permit the acids of the body or other acids to pass readily through it, and which at one end is secured to an insulating plug or base 12. The opposite pole 13 of the battery is of zinc, is also cylindrical, and it is secured at one end to the plug or base 12. The inner or zinc pole 13 is held entirely within the copper pole 10 from which it is insulated as described. A conducting wire 14, is connected with the zinc pole near its free end and leads out through the insulating plug or base 12 and connects with a conducting button 15, preferably of copper which is held upon the outer end of the plug. This provides for a complete circuit, as the current will pass from the zinc pole through the wire 14 and button 15, and through a portion of the patient's body to the copper pole 10. A bail 16, is secured to one end of the outer or copper pole 10, and to this is attached a string 17, by which the battery may be pulled out of an opening in the body in which it may have been inserted.

When the battery is used externally it is held in the hand beneath the arm, between the legs or applied to any affected part, and the perspiration and acids of the body acting on the battery poles, will cause a mild current to be generated which will pass through the body in the manner described above. If a stronger current is desired, the battery is dipped in vinegar or other acid before applying it to the body.

The shape of the battery enables it to be easily used internally, and to do this it is only necessary to stick it into the mouth, vagina or rectum. The acids of the body will cause a sufficient current to be generated and after it has remained in place for a sufficient time it may be removed by means of the string 17.

It will be understood that this battery may be very cheaply made, and it will be seen that it is a true galvanic battery capable of generating current enough to materially affect a person.

Having thus described my invention, what I claim as new and desire to secure by Letters Patent, is—

1. A galvanic battery of cylindrical shape, having concentric poles, and a bail secured to one end of the battery, substantially as shown and described.

2. A galvanic battery, comprising an outer perforated cylindrical shell forming one pole, an inner cylinder forming the opposite pole, an insulating base or plug secured to the two poles, a button secured to the outer end of the base or plug and connected by a conductor with the inner pole, and a bail secured to one end of the battery, substantially as shown and described.

WILLIAM ROBERT REUD.

Witnesses:
WARREN B. HUTCHINSON,
C. SEDGWICK.